(12) United States Patent
Kursun (10) Patent No.: US 11,521,019 B2
(45) Date of Patent: Dec. 6, 2022

(54) SYSTEMS AND METHODS FOR INCREMENTAL LEARNING AND AUTONOMOUS MODEL RECONFIGURATION IN REGULATED AI SYSTEMS

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 720 days.

(21) Appl. No.: 16/533,089

(22) Filed: Aug. 6, 2019

(65) Prior Publication Data

US 2021/0042581 A1 Feb. 11, 2021

(51) Int. Cl.
*G06N 20/00* (2019.01)
*G06K 9/62* (2022.01)
*G06N 5/04* (2006.01)

(52) U.S. Cl.
CPC .......... *G06K 9/6262* (2013.01); *G06N 5/046* (2013.01); *G06N 20/00* (2019.01)

(58) Field of Classification Search
CPC ....... G06K 9/6262; G06N 20/00; G06N 5/046
USPC .......................................................... 706/12
See application file for complete search history.

(56) References Cited

U.S. PATENT DOCUMENTS

| 8,630,989 | B2 | 1/2014 | Blohm et al. |
| 9,229,800 | B2 | 1/2016 | Jain et al. |
| 9,471,883 | B2 | 10/2016 | Chatterjee et al. |
| 9,959,328 | B2 | 5/2018 | Jain et al. |
| 9,967,285 | B1 | 5/2018 | Rossman et al. |
| 10,216,558 | B1* | 2/2019 | Gaber ............... G06F 11/0727 |
| 10,311,092 | B2 | 6/2019 | Ganjam et al. |
| 2004/0027349 | A1 | 2/2004 | Landau et al. |
| 2011/0218827 | A1 | 9/2011 | Kenefick et al. |
| 2012/0221485 | A1 | 8/2012 | Leidner et al. |
| 2012/0296845 | A1 | 11/2012 | Andrews et al. |
| 2013/0138428 | A1 | 5/2013 | Chandramouli et al. |
| 2013/0311485 | A1 | 11/2013 | Khan |
| 2014/0279716 | A1 | 9/2014 | Cormack et al. |
| 2016/0028681 | A1 | 1/2016 | Freire et al. |
| 2016/0321582 | A1* | 11/2016 | Broudou ............... G06N 20/00 |
| 2016/0350885 | A1 | 12/2016 | Clark |
| 2017/0235813 | A1 | 8/2017 | Munro et al. |
| 2018/0060512 | A1 | 3/2018 | Sorenson et al. |
| 2018/0075554 | A1 | 3/2018 | Clark |
| 2018/0121931 | A1 | 5/2018 | Bender et al. |

(Continued)

*Primary Examiner* — Jin Ge (74) *Attorney, Agent, or Firm* — Moore & Van Allen PLLC; Nicholas C. Russell (57) ABSTRACT

Embodiments of the system, as described herein leverage artificial intelligence, machine-learning, and/or other complex, specific-use computer systems to provide a novel approach for identifying patterns in input data and determine and implement necessary changes to a regulated ML model within the bounds of a regulatory control structure. The system utilizes a collection of machine learning models, either individually or clustered, to process incoming data to determine if specific data should be flagged as irregular or part of the formation of an emerging pattern. The system may intelligently analyze such patterns to determine any regulatory implications that may arise from acting on or adapting to the perceived patterns.

17 Claims, 5 Drawing Sheets

(56) References Cited

U.S. PATENT DOCUMENTS

| | | | |
|---|---|---|---|
| 2018/0189797 A1* | 7/2018 | Ravi | G06Q 30/018 |
| 2018/0276560 A1* | 9/2018 | Hu | G06N 20/00 |
| 2018/0293501 A1* | 10/2018 | Ambati | G06N 5/02 |
| 2019/0188605 A1 | 6/2019 | Zavesky et al. | |
| 2019/0188848 A1 | 6/2019 | Madani et al. | |
| 2020/0034665 A1* | 1/2020 | Ghanta | G06N 5/04 |
| 2020/0320349 A1* | 10/2020 | Yu | H04L 9/0637 |

* cited by examiner

SYSTEMS AND METHODS FOR INCREMENTAL LEARNING AND AUTONOMOUS MODEL RECONFIGURATION IN REGULATED AI SYSTEMS

BACKGROUND

Use of machine learning and artificial intelligence techniques to analyze interaction data and resource data is becoming more prevalent. In some cases, datasets used to train machine learning models may become quickly outdated as the incoming interaction data changes over time. As such, there is a need for improved systems that incorporate collaborative machine learning technology designed to detect changes in incoming data and having an enhanced ability to adapt the machine learning training and data analysis.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

The use of machine learning (ML) algorithms and artificial intelligence (AI) to detect patterns in activity and interactions via incoming data is a useful tool in protecting users from potential malfeasant activity, especially when such users depend on a network-based solution for one or more applications or use-cases. However, systems that incorporate ML and AI technology may be under the purview of regulatory bodies which require certain protocols and standards to be respected. Such regulation may hamper the ability of the system to adapt readily to a changing data stream or changing patterns observed in input data or user behavior. As such, there is a need for a system that possesses the ability to adapt quickly while remaining within the bounds of regulatory compliance. For this reason, the current invention incorporates multiple ML and AI systems that work in tandem to not only identify patterns in incoming data, but also analyze how the identified patterns and reactions to such patterns may implicate certain regulatory requirements, and implement incremental learning adjustments that maintain compliance with regulatory standards.

Currently, such review is typically done by regulatory committees or human review whenever a restrictive security action or implemented system policy has the potential for affecting a protected class, implicating an international data privacy law, and the like. This is a necessary and important process that could potentially take months to complete, giving malfeasant actors certain patterns with the knowledge that entity systems will not be updated to reflect patterns malfeasant activity for some time. As one would expect, such manual reviews can also be time consuming and costly to complete, both in terms of resources required for review, and the opportunity cost associated with time for review and implementation, which may put an entity in a situation where patterns of malfeasant activity could be identified and stopped, but is not identified due to outdated modeling. Embodiments of the present invention address these and/or other needs by providing an innovative system, method and computer program product for incremental learning and autonomous model reconfiguration in ML models. A collaborative artificial intelligence system for improving machine learning model adaptability utilizes a combination of machine learning engines in order to incorporate regulatory input when adapting to perceived changes in received input data. The system generally comprises receiving input data for analysis by a regulated machine learning model and a compliance machine learning engine; detecting, via the regulated machine learning model, an emerging pattern in the input data; receiving compliance data at the compliance machine learning engine, wherein the compliance data comprises rules, regulations, policies, predetermined thresholds, and known reference data and patterns; determining, via the compliance machine learning engine, an incremental learning threshold for the detected emerging pattern; and retraining the regulated machine learning model to incorporate the emerging pattern, wherein the retraining further comprises using input data within the incremental learning threshold.

In some embodiments, the system is further configured to determine, via the regulated machine learning model, an optimization learning adjustment for optimization of the accuracy of the regulated machine learning model based on received input data; and balance the optimization learning adjustment with the incremental learning adjustment to optimize retraining of the regulated machine learning model within the boundaries of the incremental learning adjustment threshold.

In further embodiments, the incremental learning threshold is continually adjusted by the compliance machine learning engine as additional input data is received or additional compliance data is received.

In still other embodiments, the compliance machine learning engine further comprises an input and output machine learning model and an analysis and optimization engine that work in tandem to determine the incremental learning threshold.

In some embodiments, use of the invention further comprises deploying one or more additional compliance machine learning engines, wherein incremental learning thresholds determined by the one or more additional compliance machine learning engines are compared and optimized to balance compliance and accuracy of the regulated machine learning model.

In some embodiments, the compliance machine learning engine is further configured to report determined incremental learning thresholds and emerging pattern data to an internal compliance system or an external regulatory body.

In other embodiments, use of the invention further comprises performing a periodic assessment of the regulated machine learning model to determine the agility and responsiveness in determining emerging patterns in the received input data.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the system, as described herein leverage artificial intelligence, machine-learning, and/or other complex, specific-use computer systems to provide a novel approach for identifying patterns in input data and determine and implement necessary changes to a regulated ML model within the bounds of a regulatory control structure. The system utilizes a collection of machine learning models, either individually or clustered, to process incoming data to determine if specific data should be flagged as irregular or part of the formation of an emerging pattern. The system may intelligently analyze such patterns to determine any regulatory implications that may arise from acting on or adapting to the perceived patterns. The system then analyzes and evaluates the models based on performance metrics of the models which gauge the performance (i.e., accuracy, resource efficiency, reliability, stability, and the like), adaptability (i.e., robustness and diversity, and the like), of the machine learning models. Based on identified patterns, the system may also be configured to generate an ensemble of machine learning models in order to provide a combined group of models that is determined to be accurate and efficient in identifying relevant patterns for determining emerging pattern activity or suspected malfeasance. Reconfiguration of the ML models may further include architectural changes through the addition and/or removal of particular models or model clusters as well as reweighting of models. As such, the present invention provides a technical solution to a technical problem of limited adaptability with a regulatory framework by implementing additional intelligence and ML technologies in real time in order to analyze identified patterns in light of regulatory frameworks, and incrementally deploy adaptations in a compliant manner.

In conventional systems, suspected malfeasance or irregular activity may be detected during a transaction or interaction with an entity and may either be detected by the entity as abnormal or be reported to the entity so that it may later be labeled as abnormal input data. For instance, an interaction with an entity that involves resource transfer from an account stored at the entity may be flagged for a number of reasons, such as an irregular time of day, an associated geolocation that seems abnormal, a resource destination that is known to be associated with malfeasance, and the like. In this way, the entity may compare any given interaction with a baseline of known information in order to determine suspected malfeasance or abnormality. Alternatively, the entity may receive a communication from a user that a given interaction is not legitimate and should be flagged as abnormal or irregular, and the entity system may flag similar interactions as suspect. While conventional systems may be able to discern emerging patterns in received input data, there is a clear need for a system which possesses the ability to make adjustment in a compliant manner. For instance, the ML model may identify or flag certain characteristics of transactions, users and the like that are considered related to a protected class. In these instances, the ML model may restricted from employing and restrictive policies to thwart a malfeasant pattern because doing so would implicate a regulatory compliance issue. As such, incorporating such regulatory policies within the process of adapting the ML models is necessary, and the ability to implement changes on an incremental basis may allow more flexibility for the system to react effectively, while still remaining in compliance with relevant regulatory procedures.

It is also noted that while the embodiments discussed in this application may be centered around malfeasant activity in particular for the sake of simplicity and clarity, it is well understood that the systems and methods described herein have many other use cases and may be applied in any situation where it would be useful to assess patterns in incoming data streams via a machine learning model. For instance, the same systems may be applied to genomic research data, research data, financial market data, network data at a business, university, online multiplayer interface, and even with relation to social media monitoring and policing of hate speech, violent images, and political interference or social engineering concerns. In each scenario, there may be instances where restrictive data policies may be recommended or identified by a machine learning algorithm that must first be reviewed for regulatory compliance before being implemented. In any such situation, the machine learning model configuration described herein would be immensely helpful.

In addition, conventional systems may use a binary approach to labeling data as potentially malfeasant. This "legitimate" versus "illegitimate" approach to analyzing interactions makes it difficult for the entity to accurately predict patterns of suspect behavior due to the limited amount of data collected. The present invention improves on these conventional approaches by providing a system for using ML models that are trained using varied data populations in order to analyze patterns of interactions and user behavior and to determine a confidence score, or predicted percentage value, that a given interaction may be illegitimate. The system considers reported input data from users and analysts, but assigns a weighted value and combines this input with other observed interaction data from various other channels, thus using a wider variety of metrics in order to make a determination about suspected abnormal activity versus conventional systems. Additionally, each ML model may be later assessed to determine prediction accuracy, which allows the system to be optimized for accuracy by varying the ML model ensemble combination used in certain embodiments.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a population of machine learning models, wherein the system enables the user to reconfigure the population based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, management firms, insurance companies and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models. In another embodiments, monitoring may comprise identifying patterns of malfeasant or non-malfeasant activity that are correlated with one or more data points received.

As used herein, an "interaction" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from an input data stream (e.g., in real-time). An interaction may include user interactions with a user interface (e.g., clicking, swiping, text or data entry, and the like), authentication actions (e.g., signing-in, username and password entry, PIN entry, and the like), account actions (e.g., account access, fund transfers, and the like) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

Figure 1:
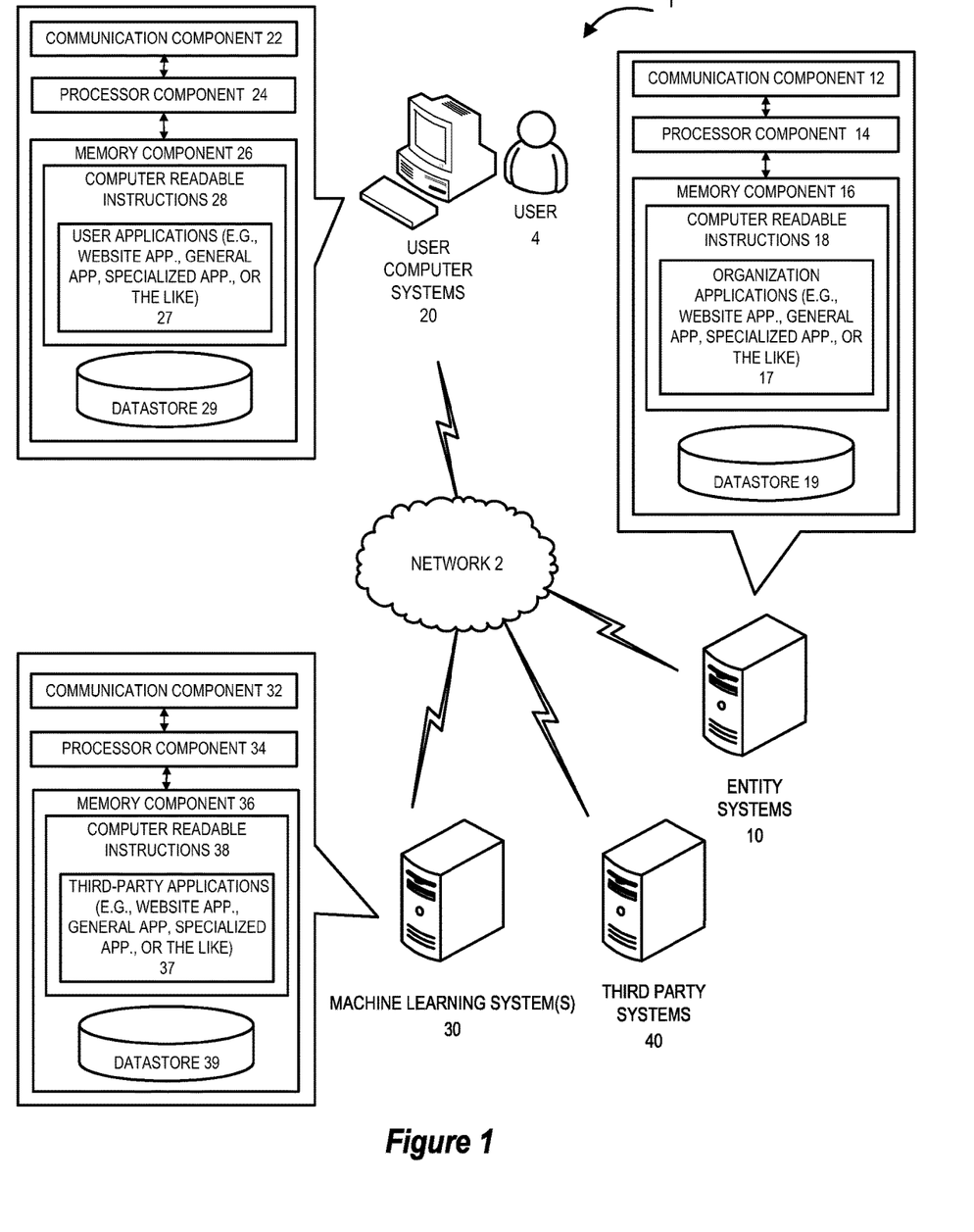
FIG. 1 provides a diagram of a system environment for incremental learning and autonomous model reconfiguration, in accordance with embodiments of the invention.

FIG. 1 provides a diagram of a system environment for incremental learning and autonomous model reconfiguration, in accordance with embodiments of the invention. As illustrated in FIG. 1, one or more entity systems 10 are operatively coupled, via a network 2, to one or more user computer systems 20 (e.g., authorized user systems and/or unauthorized user systems), one or more machine learning systems 30, one or more third party systems 40, and/or one or more other systems (not illustrated). In this way, the one or more entity systems 10 may receive communications, including authentication credentials, or the like, from a requestor (e.g., a user 4 and/or other systems making a request) and thereafter utilize the systems and processes described herein to store data securely, control access by various requestors, and/or deterring unauthorized requestors from accessing data. It should be understood that the users 4 may be one or more associates, employees, agents, contractors, sub-contractors, third-party representatives, customers, or the like, and the systems may be the user computer systems 20, third-party systems 40, or other systems.

As such, the one or more entity systems 10 may be utilized to control access to the machine learning systems 30, and allow, prevent, and/or monitor usage of the machine learning systems 30 through communication with the one or more user computer systems 20, the one or more machine learning systems 30, the one or more third-party systems 40, and/or the one or more other systems, as will be discussed in further detail herein. As will be described in further detail herein, embodiments of the present invention allow for improved security and reduced storage requirements through the improved data storage techniques described herein.

The network 2 illustrated in FIG. 1, through which the systems communicate, may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more entity systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more machine learning systems 30, the one or more third-party systems, and/or the one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more entity systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to monitor, communicate with, and/or take actions with respect to the authorized users and systems and/or unauthorized users and systems). In some embodiments, the one or more memory components 16 include one or more data stores 19 for storing data related to the one or more entity systems 10, including, but not limited to, data created, accessed, and/or used by the one or more organization applications 17. The one or more organization applications 17 may be applications that are specifically for monitoring, communicating with, and/or capturing information from authorized and/or unauthorized users and/or system, and/or storing and accessing data within zoned databases (e.g., by interacting with the user computer systems 20 and user applications 27, communicating with the machine learning systems 30 and third party applications 37, third-party systems, and/or other systems).

As illustrated in FIG. 1, users 4 may try to access the entity systems 10 in order to store and/or access data from the one or more entity systems 10 and/or one or more machine learning systems 30 (e.g., any type of unsecured or secured data for which the user would like to store or access, or the like). In some cases the users 4 may be authorized users, such as users that have access to the one or more entity systems 10 and/or the one or more machine learning systems 30. Alternatively, the users 4 may be unauthorized users, such as users that are trying to misappropriate data from the one or more machine learning systems 30. The users 4 may utilize the one or more user computer systems 20 (e.g., authorized user computer systems or unauthorized user computer systems) to communicate with and/or access data from the one or more entity systems 10 and/or the one or more machine learning systems 30. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or one or more user applications 27 used by any of the foregoing, such as web browsers applications, dedicated applications, specialized applications, or portions thereof. It should be understood that the one or more computer systems 20 may be systems that are internal to the organization (e.g., users are employees, or the like) or may be systems that are external to the organization (e.g., users are located outside of the organization).

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more entity systems 10, the one or more machine learning systems 30, the one or more third-party systems 40, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, a web browser or other applications that allow operation of the one or more user computer systems 20, and that allow users 4 to access and/or take various actions with respect to the one or more organizations systems 10 and/or the one or more machine learning systems 30, through the use of the one or more user computer systems 20, or the like.

As illustrated in FIG. 1, the one or more machine learning systems 30 may communicate with the one or more entity systems 10 and/or the one or more user computer systems 20 directly or indirectly (e.g., through the one or more entity systems 10). The one or more machine learning systems 30, and/or the one or more third party applications 37 thereof. It should be understood that the one or more machine learning systems 30 may be third-party systems 40 and/or may be part of the entity systems 10. As such, the one or more machine learning systems 30 are operatively coupled, via a network 2, to the one or more entity systems 10, the one or more user computer systems 20, the one or more third-party systems 40, and/or the one or more other systems. The one or more machine learning systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other systems or components on the network 2, such as, but not limited to, the one or more entity systems 10, the one or more user computer systems 20, the one or more third party systems 40, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more machine learning systems 30 may have computer-readable instructions 38 stored in the one or more memory components 36, which in some embodiments includes the computer-readable instructions 38 of one or more third party applications 37 that store data and/or mixes discrete data, both of which, alone or in combination, improve data security and/or data storage capacity. It should be understood that the access to the one or more machine learning systems 30, or applications thereof, may be controlled by the one or more entity systems 10 and/or one or more user computer systems 20, as is described herein.

Moreover, as illustrated in FIG. 1, the one or more third-party systems 40 and/or one or more other systems (not illustrated) may be operatively coupled to the one or more entity systems 10, the one or more user computer systems 20, and/or the one or more machine learning systems 30, through the network 2. The one or more third-party systems 40 and/or the other systems have features that are the same as or similar to the features described with respect to the one or more entity systems 10, the one or more user computer systems 20, and/or the one or more machine learning systems 30 (e.g., one or more communication components, one or more processor components, and one or more memory components with computer-readable instructions of one or more applications, one or more datastores, or the like). Thus, the one or more third party systems 40 and/or the other systems communicate with the one or more entity systems 10, the one or more user computer systems 20, the one or more machine learning systems 30, and/or each other in same or similar way as previously described with respect to the one or more entity systems 10, the one or more user computer systems 20, and/or the one or more machine learning systems 30. It should be understood that the one or more third-party systems 40 may store data, act as an intermediary, and/or interact with the various systems that may be needed for operation of the system environment described herein.

Figure 2:
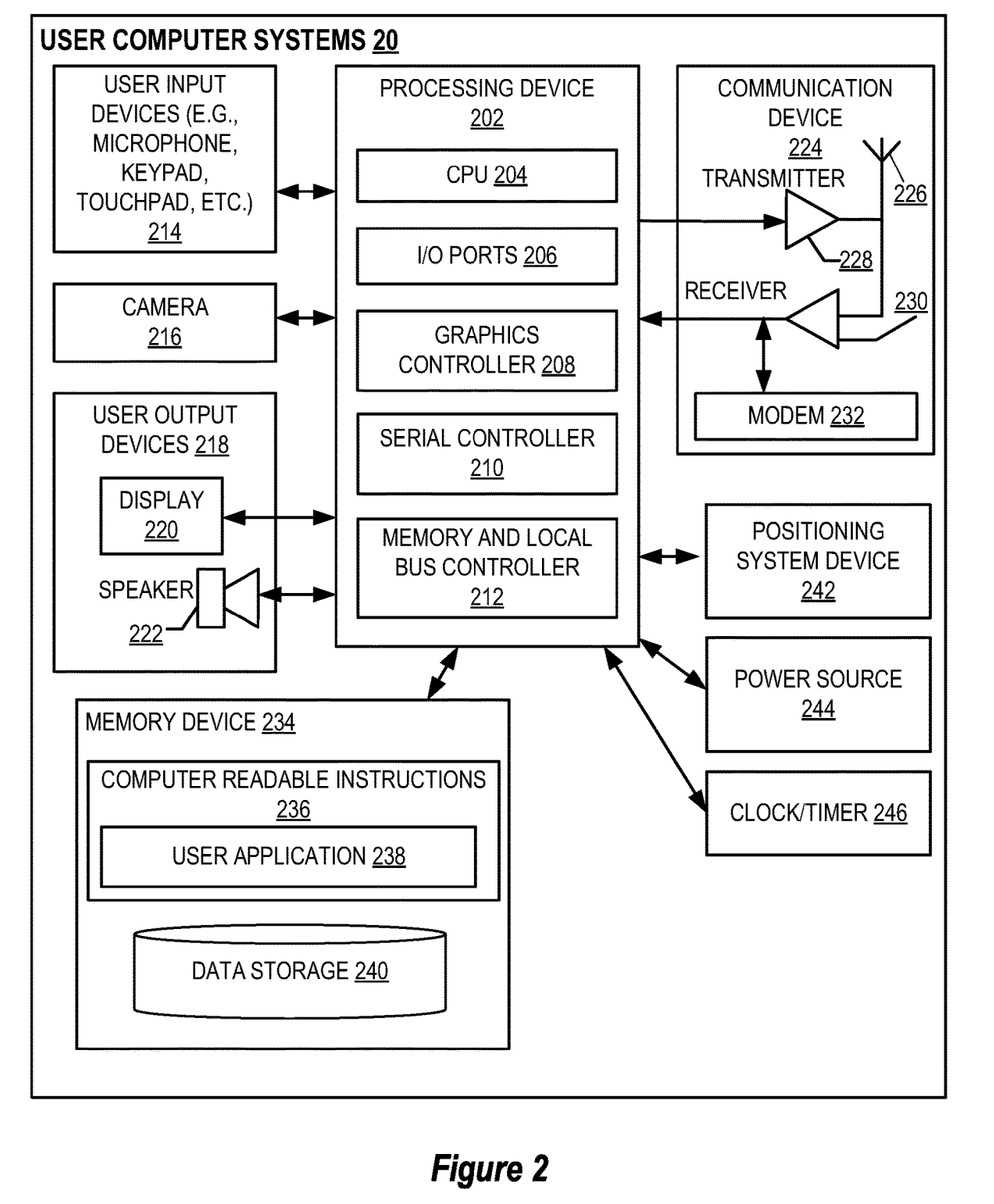
FIG. 2 provides a block diagram of a user device, in accordance with one embodiment of the invention.

FIG. 2 provides a block diagram of the user computer systems 20, in accordance with one embodiment of the invention. The user computer systems 20 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user computer systems 20 to transmit and receive data and instructions from the other devices and systems of the environment 100. The user computer systems 20 comprises computer-readable instructions 236 and data storage 240 stored in the memory device 234, which in one embodiment includes the computer-readable instructions 236 of a user application 238. In some embodiments, the user application 238 allows a user 4 to access and/or interact with other systems such as the entity system 120. In one embodiment, the user 4 is a maintaining entity of a machine learning system 30, wherein the user application enables the user 4 to define policies and reconfigure a the ML model. In one embodiment, the user 4 is a customer of a financial entity and the user application 238 is an online banking application providing access to the entity system 10 wherein the user may interact with a user account via a user interface of the user application 238, wherein the user interactions may be provided in a data stream as an input to one or more machine learning models.

The processing device 202 may be configured to use the communication device 224 to communicate with one or more other devices on a network 2. In this regard, the communication device 224 may include an antenna 226 operatively coupled to a transmitter 228 and a receiver 230

(together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 2. In this regard, the user computer systems 20 may be configured to operate with one or more air interface standards, communication protocols, modulation types, and access types. By way of illustration, the user computer systems 20 may be configured to operate in accordance with any of a number of first, second, third, and/or fourth-generation communication protocols or the like. For example, the user computer systems 20 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user computer systems 20 may also be configured to operate in accordance with non-cellular communication mechanisms, such as via a wireless local area network (WLAN) or other communication/data networks. The user computer systems 20 may also be configured to operate in accordance, audio frequency, ultrasound frequency, or other communication/data networks.

The user computer systems 20 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 10, machine learning systems 30, or third party systems 40 (as illustrated in FIG. 1) which are connected to the user computer systems 20. In this way, while only one of each of the entity system 10, machine learning systems 30, and third party system 40 is shown in FIG. 1, it is understood that multiple networked systems may make up the system environment 1.

Figure 3:
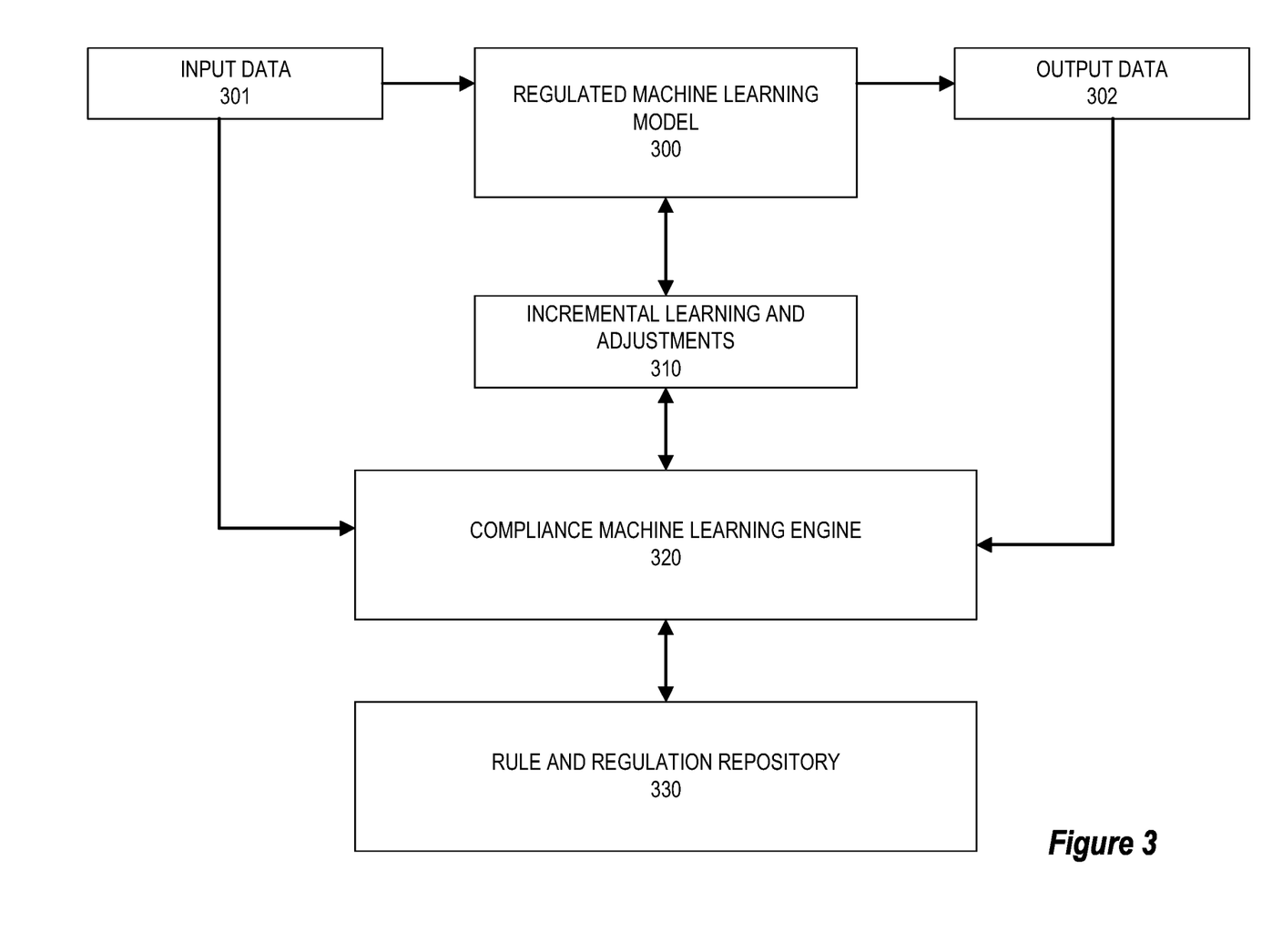
FIG. 3 provides a block diagram of interaction between a regulated machine learning model and a compliance machine learning engine, in accordance with one embodiment of the invention.

FIG. 3 provides a block diagram of interaction between a regulated machine learning model and a compliance machine learning engine, in accordance with one embodiment of the invention. As shown, input data 301 is received by a regulated machine learning (ML) model 300. The regulated ML model 300 is considered a subset of the one or more ML systems 30 discussed previously with respect to FIGS. 1 and 2. The regulated ML model 300 is designed to make incremental learning adjustments 310 in tandem with the determinations made by the compliance machine learning engine 320 and communicated to the regulated ML model 300. As discussed in more detail with respect to FIG. 4, the compliance machine learning engine 320 accesses a rule and regulation repository 330, and it is trained to use data from the rule and regulation repository 330 to collectively formulate and approve incremental learning adjustments 310 with the regulated ML model 300. The regulated ML model 300 and the compliance machine learning engine 320 will consider input data 301 patterns, output data 302 patterns, thresholds for model performance, distributions of identified patterns between different ML models, requirements and thresholds of regulatory statutes and policies, and will attempt to find a balance between maintaining compliance and also improving the accuracy of the regulated ML model 300.

For instance, the regulated ML model 300 may identify, using a combination of supervised or unsupervised learning techniques, an emerging pattern in the input data 301, and may determine that the pattern signifies a greater likelihood of malfeasant activity correlated with certain aspects of the input data 301, which may contain metadata related to time, date, location, communication channel, account, and the like. In other embodiments, the regulated ML model may access a data store 39 or receive data from a third party system 40 or user computer system 20 that indicates a certain known pattern or known data anomaly that may require attention, and may use this data to inform its own process of data analysis. If the regulated ML model 300 determines that the identified pattern of data warrants incremental learning adjustments 310, the regulated ML model must first initiate a request to the compliance ML engine 320 to approve such incremental learning and adjustments 310 by determining that the incremental learning and adjustments are within a threshold of regulatory compliance, or an incremental learning threshold.

In order for the compliance ML engine 320 to make an approval determination for incremental learning and adjustments 310, it may also receive input data 301 and output data 302 in order to gain a full picture of the emerging pattern, which allows the compliance ML engine 320 to work in tandem with the regulated ML model 300, as opposed to simply approving or denying the incremental learning and adjustments 310 based on the suggestions from the regulated ML model 300. In this way, the system ensures that the compliance ML engine 320 can also learn and adapt over time according to actual data received and output by the regulated ML model 300, and that the context of every approval or denial scenario is fully understood and recorded for later review.

Figure 4:
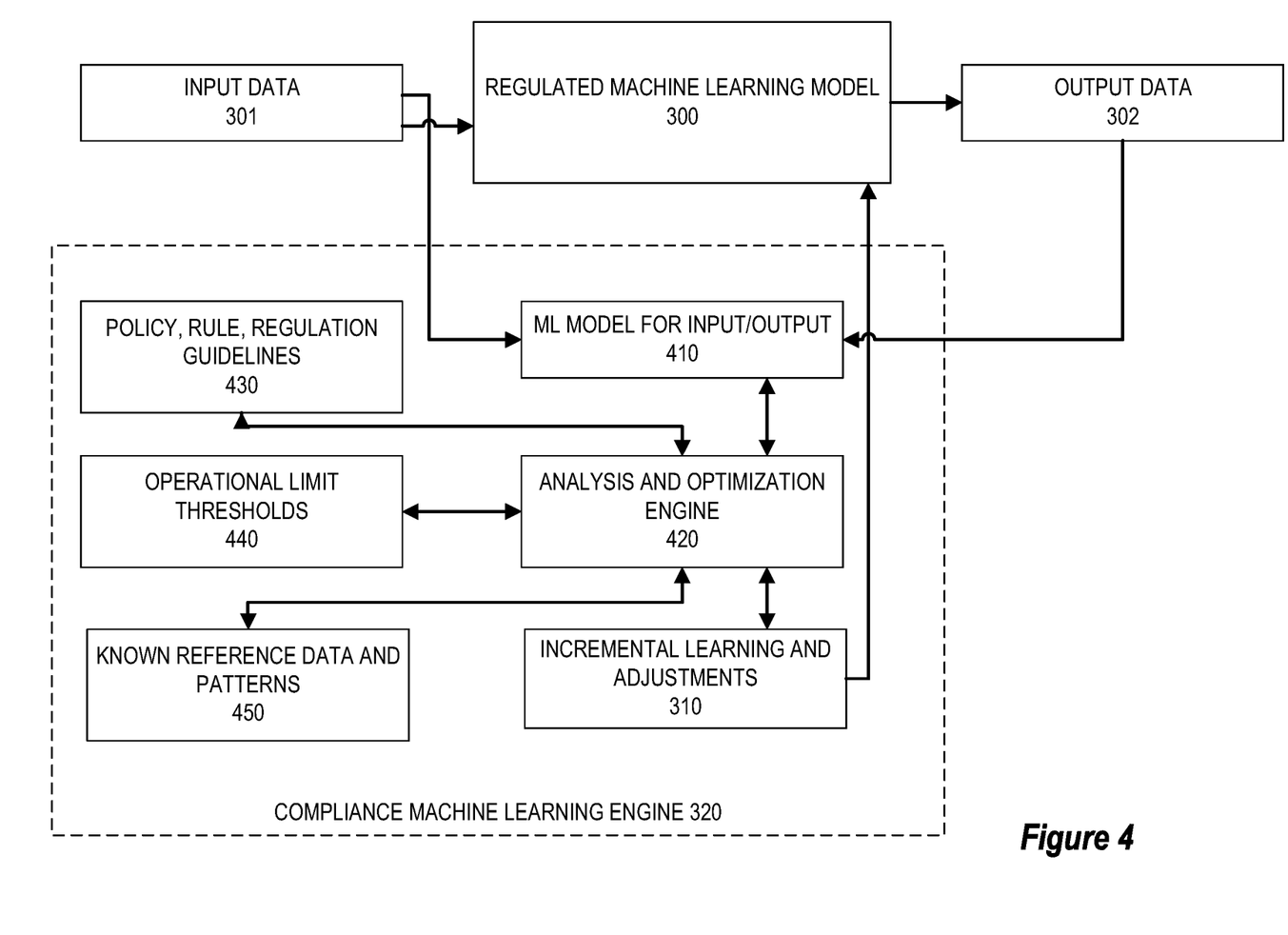
FIG. 4 provides a block diagram for the process flow within a compliance machine learning engine, in accordance with one embodiment of the invention.

FIG. 4 provides a block diagram for the process flow within a compliance machine learning engine 320, in accordance with one embodiment of the invention. As shown, the compliance ML engine 320 may be further dissected to more fully understand its operation. The compliance ML engine 320 receives data at the machine learning model for input and output, as indicated at block 410, where the ML model for input/output 410 receives input data 301 and output data 302. This ML model for input and output data 410 works in conjunction with an analysis and optimization engine 420, which receives the output data from the ML model for input/output 410 and conducts an analysis based on three major aspects. These aspects include policies, rules, regulations and guidelines, as shown in block 430, operational limit thresholds, as shown in block 440, and known reference data and patterns, as shown in block 450. Using this data, the analysis and optimization engine 420 may alter, approve, or deny the incremental learning and adjustments 310, and communicate this information back to the regulated ML model 300. In addition, the analysis and optimization engine 420 may set certain peripheral boundaries which are considered compliant and for which incremental learning adjustments 310 may be made, or in other words, an incremental learning threshold in which the regulated ML model 300 may be optimized.

For instance, the analysis and optimization engine 420 may determine that the regulated ML model 300 may make certain changes or adjustments to learn from incoming data patterns based on a certain time period, range of information, or any other data point that the regulated ML model 300 may consider important that also relates to a compliance or regulatory concern. This ensures that the regulated ML model 300 can make changed over time while still remaining compliant.

Figure 5:
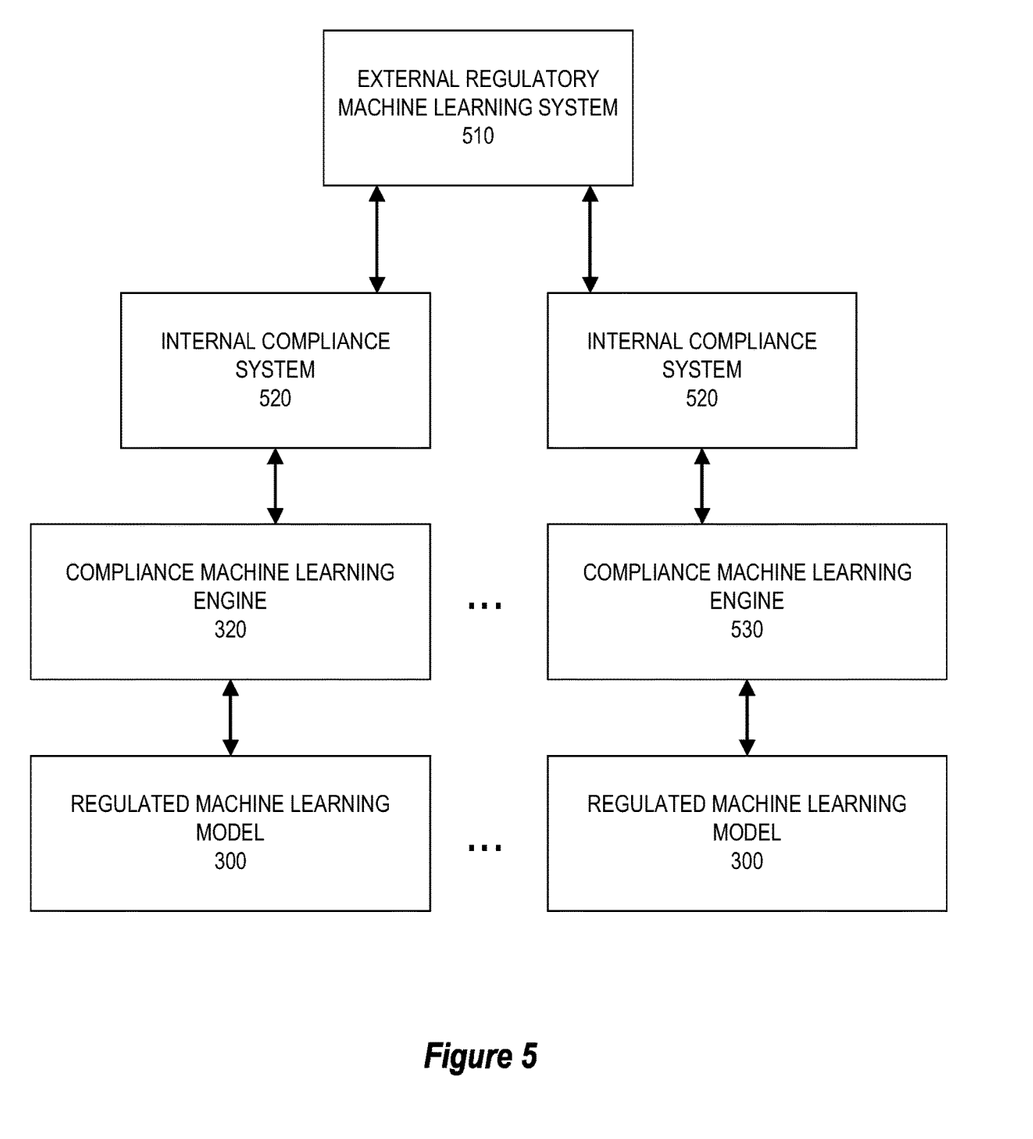
FIG. 5 provides a block diagram for the data flow between external systems and a regulated machine learning model, in accordance with one embodiment of the invention.

FIG. 5 provides a block diagram for the data flow between external systems and a regulated machine learning model, in accordance with one embodiment of the invention. The policies, rules, regulations, and guidelines discussed in FIG. 4 with respect to block 430 may be received from one or more external regulatory systems, or third party systems 40. In some embodiments, the one or more external regulatory systems may be responsible for conducting a machine learning analysis of its own, as indicated by the external regulatory machine learning system 510. Data from the external regulatory machine learning system 510 is shared with one or more internal compliance systems 520, which may be located internally at the entity systems 10. The compliance machine learning engine 320 then uses this information and communicates analysis and decisioning determinations about incremental learning and adjustments 310 to the regulated ML model 300. As shown in FIG. 5, in some embodiments there may be one or more of each of these components located at their respective systems, such as third party systems 40, which house external regulatory machine learning system 510, machine learning systems 30, which house the regulated ML model(s) 300, or entity systems 10, which house the internal compliance system(s) 520. In some embodiments there will be twin compliance machine learning engines that are parenting the regulated ML model 300, as indicated in FIG. 5 by the compliance ML engine 320 and the compliance ML engine 530. Each of these engines will have the same components that set thresholds and allow the regulated ML model 300 to "relax" or optimize, learn and adjust its parameters based on compliance guidelines.

ML nodes shown in FIG. 5 may also have a hierarchy. As indicated by the top to bottom arrangement depicted. The hierarchy may exist within the entity itself, such as between the compliance ML engine 320 and the regulated ML model 300, but may also extend to external regulator ML system 510, such as when reporting is necessary or recommended for reporting certain data handling policies and procedures to external regulatory bodies that the entity may answer to. These regulatory bodies will vary based on the entity employing the system discussed herein, for instance in embodiments where the entity is a financial institution, data may be reported to a financial regulatory body or bodies, while a hospital might be required to report data to other regulatory bodies.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated and continuous regulatory compliance in machine learning and artificial intelligence frameworks, the system comprising:
    at least one memory device with computer-readable program code stored thereon;
    at least one communication device;
    at least one processing device operatively coupled to the at least one memory device and the at least one communication device, wherein executing the computer-readable code is configured to cause the at least one processing device to:
        receiving input data for analysis by a regulated machine learning model and a compliance machine learning engine;
        detecting, via a regulated machine learning model, an emerging pattern in the input data;
        receiving compliance data at a compliance machine learning engine, wherein the compliance data comprises rules, regulations, policies, predetermined thresholds, and known reference data and patterns;
        determining, via the compliance machine learning engine, an incremental learning threshold based on the received compliance data, wherein the incremental learning threshold comprises a constraint for responding to the detected emerging pattern;
        retraining the regulated machine learning model to incorporate the emerging pattern, wherein the retraining further comprises using input data within the incremental learning threshold;
        determining, via the regulated machine learning model, an optimization learning adjustment for optimizing accuracy of the regulated machine learning model based on received input data; and
        balancing the optimization learning adjustment with the incremental learning threshold to optimize retraining of the regulated machine learning model within boundaries of the incremental learning threshold.

2. The system of claim 1, wherein the incremental learning threshold is continually adjusted by the compliance machine learning engine as additional input data is received or additional compliance data is received.

3. The system of claim 1, wherein the compliance machine learning engine further comprises an input and output machine learning model and an analysis and optimization engine that work in tandem to determine the incremental learning threshold.

4. The system of claim 1, further comprising deploying one or more additional compliance machine learning engines, wherein incremental learning thresholds determined by the one or more additional compliance machine learning engines are compared and optimized to balance compliance and accuracy of the regulated machine learning model.

5. The system of claim 1, wherein the compliance machine learning engine is further configured to report determined incremental learning thresholds and emerging pattern data to an internal compliance system or an external regulatory body.

6. The system of claim 1, further comprising performing a periodic assessment of the regulated machine learning model to determine agility and responsiveness in determining emerging patterns in the received input data.

7. A computer program product for automated and continuous regulatory compliance in machine learning and artificial intelligence frameworks, the computer program product comprising at least one non-transitory computer-readable medium having computer-readable program code portions embodied therein, the computer-readable program code portions comprising:
    an executable portion configured for receiving input data for analysis by a regulated machine learning model and a compliance machine learning engine;
    an executable portion configured for detecting, via a regulated machine learning model, an emerging pattern in the input data;
    an executable portion configured for receiving compliance data at a compliance machine learning engine, wherein the compliance data comprises rules, regulations, policies, predetermined thresholds, and known reference data and patterns;
    an executable portion configured for determining, via the compliance machine learning engine, an incremental learning threshold based on the received compliance data, wherein the incremental learning threshold comprises a constraint for responding to the detected emerging pattern;
    an executable portion configured for retraining the regulated machine learning model to incorporate the emerging pattern, wherein the retraining further comprises using input data within the incremental learning threshold;

an executable portion configured for determining, via the regulated machine learning model, an optimization learning adjustment for optimizing accuracy of the regulated machine learning model based on received input data; and an executable portion configured for balancing the optimization learning adjustment with the incremental learning threshold to optimize retraining of the regulated machine learning model within boundaries of the incremental learning threshold.

8. The computer program product of claim 7, wherein the incremental learning threshold is continually adjusted by the compliance machine learning engine as additional input data is received or additional compliance data is received.

9. The computer program product of claim 7, wherein the compliance machine learning engine further comprises an input and output machine learning model and an analysis and optimization engine that work in tandem to determine the incremental learning threshold.

10. The computer program product of claim 7, further comprising deploying one or more additional compliance machine learning engines, wherein incremental learning thresholds determined by the one or more additional compliance machine learning engines are compared and optimized to balance compliance and accuracy of the regulated machine learning model.

11. The computer program product of claim 7, wherein the compliance machine learning engine is further configured to report determined incremental learning thresholds and emerging pattern data to an internal compliance system or an external regulatory body.

12. The computer program product of claim 7, further comprising performing a periodic assessment of the regulated machine learning model to determine agility and responsiveness in determining emerging patterns in the received input data.

13. A computer-implemented method for automated and continuous regulatory compliance in machine learning and artificial intelligence frameworks, the computer-implemented method comprising:

receiving input data for analysis by a regulated machine learning model and a compliance machine learning engine;

detecting, via a regulated machine learning model, an emerging pattern in the input data;

receiving compliance data at a compliance machine learning engine, wherein the compliance data comprises rules, regulations, policies, predetermined thresholds, and known reference data and patterns;

determining, via the compliance machine learning engine, an incremental learning threshold based on the received compliance data, wherein the incremental learning threshold comprises a constraint for responding to the detected emerging pattern;

retraining the regulated machine learning model to incorporate the emerging pattern, wherein the retraining further comprises using input data within the incremental learning threshold;

determining, via the regulated machine learning model, an optimization learning adjustment for optimizing accuracy of the regulated machine learning model based on received input data; and balancing the optimization learning adjustment with the incremental learning threshold to optimize retraining of the regulated machine learning model within boundaries of the incremental learning threshold.

14. The computer implemented method of claim 13, wherein the incremental learning threshold is continually adjusted by the compliance machine learning engine as additional input data is received or additional compliance data is received.

15. The computer implemented method of claim 13, wherein the compliance machine learning engine further comprises an input and output machine learning model and an analysis and optimization engine that work in tandem to determine the incremental learning threshold.

16. The computer implemented method of claim 13, further comprising deploying one or more additional compliance machine learning engines, wherein incremental learning thresholds determined by the one or more additional compliance machine learning engines are compared and optimized to balance compliance and accuracy of the regulated machine learning model.

17. The computer implemented method of claim 13, wherein the compliance machine learning engine is further configured to report determined incremental learning thresholds and emerging pattern data to an internal compliance system or an external regulatory body.

* * * * *